(12) United States Patent
Mishra et al.

(10) Patent No.: US 9,471,469 B2
(45) Date of Patent: Oct. 18, 2016

(54) SOFTWARE AUTOMATION AND REGRESSION MANAGEMENT SYSTEMS AND METHODS

(71) Applicants: Rajnish Mishra, San Jose, CA (US); Jaspreet Singh, Patiala (IN); Ajit Singh, Hisar (IN); Shivani Sharma, Ambala Cantt (IN); Mandeep Singh, Mohali (IN); Shivam Dhingra, Cantt (IN)

(72) Inventors: Rajnish Mishra, San Jose, CA (US); Jaspreet Singh, Patiala (IN); Ajit Singh, Hisar (IN); Shivani Sharma, Ambala Cantt (IN); Mandeep Singh, Mohali (IN); Shivam Dhingra, Cantt (IN)

(73) Assignee: Zscaler, Inc., San Jose, CA (US)

( * ) Notice: Subject to any disclaimer, the term of this patent is extended or adjusted under 35 U.S.C. 154(b) by 144 days.

(21) Appl. No.: 14/525,401

(22) Filed: Oct. 28, 2014

(65) Prior Publication Data
US 2016/0117235 A1    Apr. 28, 2016

(51) Int. Cl.
| G06F 11/00 | (2006.01) |
| G06F 11/36 | (2006.01) |
| H04L 29/08 | (2006.01) |
| G06F 11/07 | (2006.01) |

(52) U.S. Cl.
CPC ......... *G06F 11/368* (2013.01); *G06F 11/3688* (2013.01); *G06F 11/3692* (2013.01); *H04L 67/10* (2013.01); *G06F 11/0709* (2013.01); *G06F 11/3664* (2013.01); *G06F 11/3668* (2013.01)

(58) Field of Classification Search
CPC .......... G06F 11/3688; G06F 11/3664; G06F 11/3668; G06F 11/3692; G06F 11/0709
See application file for complete search history.

(56) References Cited

U.S. PATENT DOCUMENTS

| 8,296,434 | B1* | 10/2012 | Miller | H04L 67/1029 709/220 |
| 8,418,000 | B1* | 4/2013 | Salame | G06F 11/079 714/26 |
| 2013/0174125 | A1* | 7/2013 | Trim | G06F 11/3664 717/124 |
| 2014/0215439 | A1* | 7/2014 | Krishnan | G06F 11/3664 717/124 |
| 2014/0359360 | A1* | 12/2014 | Hurst | H04L 1/24 714/31 |

* cited by examiner

*Primary Examiner* — Charles Ehne
(74) *Attorney, Agent, or Firm* — Clements Bernard PLLC; Lawrence A. Baratta, Jr.; Christopher L. Bernard

(57) ABSTRACT

An automation and regression management method for testing software in a highly-complex cloud-based system with a plurality of nodes, through an automation and regression management system, includes receiving a plurality of requests for automated test runs on nodes in the highly-complex cloud-based system; managing the plurality of requests by either starting an automated test run on a node or queuing the automated test run if another automated test run is already operating on the node; determining details of each of the automated test runs subsequent to completion; storing the details of each of the automated test runs in a database; and providing the details of each of the automated test runs to a requesting user.

20 Claims, 9 Drawing Sheets

SOFTWARE AUTOMATION AND REGRESSION MANAGEMENT SYSTEMS AND METHODS

FIELD OF THE INVENTION

Generally, the field of art of the present disclosure pertains to computer and network systems and methods, and more particularly, to automation and regression management systems and methods for complex software systems.

BACKGROUND OF THE INVENTION

In a fast paced development environment when dealing with a highly complex cloud based service solution, high software quality is quintessential. For any service based upon a cloud infrastructure, the biggest challenge is delivering high quality software updates and enhancements in short release cycles. The complex architecture of a cloud based service solution, large number of features, and a fast paced release cycle make testing a very challenging task. What adds to these challenges is the fact that any software glitch that impacts the cloud infrastructure, effects the full set of users, unlike conventional software solutions. The roles and responsibilities of Quality Assurance (QA) are amplified in such an environment with a zero margin for error. Also, with shorter release cycles, QA has less time to verify the quality of the release.

A cloud based service solution, like Zscaler (www.zscaler.com), is a complex composition of a number of services and features. Huge amounts of effort are needed to perform software testing and achieve an acceptable software quality. A fast paced development cycle and ever increasing number of features being added to the base product with every release makes this effort tougher with time. At one point in time, regression of old features itself becomes a mammoth task, and QA has to spend most of its time performing regression. Apart from this, every change being made to the software introduces the risk of side effects and the software has to go through quality tests many times during a release cycle. This approach would not scale unless complimented with automation testing to take care of regression and sanity tests. In order to achieve a high quality software release in the cloud infrastructure, it is not enough to rely solely upon manual testing. Automation takes a high priority with the growing number of features, considering the complexity of the cloud and shorter release cycles. Automation is a good servant but a bad master. If Automation is not managed properly, it will result into more efforts and no results.

There are three main challenges in automation, namely 1) maintenance of automation scripts and test infrastructure, 2) ease of automation usage, and 3) interpretation of test results. For maintenance of automation scripts and test infrastructure, in the real world, it is never automate and forget. Test Scripts always need to be tested and maintained to work against latest changes made in the cloud. There is a requirement for lots of planning and effort with good future insight. For ease of automation usage, automation infrastructure for a software product, such as for a highly complex cloud based service solution, is not simple in nature. Most of the time, it needs a high level of acquaintance with the scripts and a minimal level of programming knowledge in order to run and interpret automation test results. Hence, only a limited number of people are enabled to use automation effectively, removing the advantages automation is supposed to provide. For interpretation of test results, in order to effectively assess the quality of software, it is very important to effectively interpret the test results. This involves a comparison of results between different components across different software versions, understanding the impact of failures on the overall quality and usage of the software, and scoping the amount of effort needed to fix these issues. This becomes a challenge for a complex software product where a number of factors, both internal and external, influence the results.

BRIEF SUMMARY OF THE INVENTION

In an exemplary embodiment, an automation and regression management method for testing software in a highly-complex cloud-based system with a plurality of nodes, through a automation and regression management system, includes receiving a plurality of requests for automated test runs on nodes in the highly-complex cloud-based system; managing the plurality of requests by either starting an automated test run on a node or queuing the automated test run if another automated test run is already operating on the node; determining details of each of the automated test runs subsequent to completion; storing the details of each of the automated test runs in a database; and providing the details of each of the automated test runs to a requesting user. The automated test runs can be scripts configured to test new software builds in the plurality of nodes. The automated test runs can utilize any of Perl, Python, and Java. The method can further include comparing the details of each of the automated test runs on a subset of nodes of the plurality of nodes, wherein the subset of nodes each include a same software build. The method can further include receiving or creating the automated test runs for a new software build associated with the highly-complex cloud-based system. The method can further include receiving a new software build; performing compilation of the new software build; and installing the new software build on a node of the plurality of nodes. An automated test run can be performed subsequent to the installing. The method can further include notifying the requesting user responsive to the starting and the completion.

In another exemplary embodiment, an automation and regression management system configured to test software in a highly-complex cloud-based system with a plurality of nodes, includes a network interface communicatively coupled to a user and one or more nodes in the highly-complex system; a processor communicatively coupled to the network interface; and memory storing computer executable instructions, and in response to execution by the processor, the computer executable instructions cause the processor to receive a plurality of requests for automated test runs on nodes in the highly-complex cloud-based system, manage the plurality of requests by either starting an automated test run on a node or queuing the automated test run if another automated test run is already operating on the node, determine details of each of the automated test runs subsequent to completion, store the details of each of the automated test runs in a database, and provide the details of each of the automated test runs to a requesting user. The automated test runs can be scripts configured to test new software builds in the plurality of nodes. The automated test runs can utilize any of Perl, Python, and Java. The memory storing computer executable instructions, and in response to execution by the processor, the computer executable instructions can further cause the processor to: compare the details of each of the automated test runs on a subset of nodes of the plurality of nodes, wherein the subset of nodes each include a same software build. The memory storing computer executable instructions, and in response to execution by the processor, the computer executable instructions can further cause the processor to: receive or create the automated test runs for a new software build associated with the highly-complex cloud-based system. The memory storing computer executable instructions, and in response to execution by the processor, the computer executable instructions can further cause the processor to: receive a new software build; perform compilation of the new software build; and install the new software build on a node of the plurality of nodes. An automated test run can be performed subsequent to installation. The memory storing computer executable instructions, and in response to execution by the processor, the computer executable instructions can further cause the processor to: notify the requesting user responsive to the starting and the completion.

In a further exemplary embodiment, a cloud based security system includes a plurality of cloud nodes each communicatively coupled to the Internet and a plurality of users, wherein each of the plurality of cloud nodes is configured to perform a set of security functions for the plurality of users based on a software build executing thereon; and an automation and regression management system communicatively coupled to the plurality of nodes and configured to test the software build on each of the plurality of nodes, the automation and regression management system comprising a network interface communicatively coupled to a user and one or more nodes in the highly-complex system; a processor communicatively coupled to the network interface; and memory storing computer executable instructions, and in response to execution by the processor, the computer executable instructions cause the processor to receive a plurality of requests for automated test runs on nodes of the plurality of cloud nodes, manage the plurality of requests by either starting an automated test run on a node or queuing the automated test run if another automated test run is already operating on the node, determine details of each of the automated test runs subsequent to completion, store the details of each of the automated test runs in a database, and provide the details of each of the automated test runs to a requesting user. The automated test runs can be scripts configured to test new software builds in the plurality of nodes.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, automation and regression management systems and methods for complex software systems are described. In an exemplary aspect, the automation and regression management systems and methods are utilized in highly complex cloud based service solutions. Software Test Automation plays a key role in making sure that each cloud upgrade iteration is executed flawlessly. The automation and regression management systems and methods help by providing an easy and intuitive web interface to use and maintain automation for software testing purposes. With the automation and regression management systems and methods, starting from the first step of compiling a new software build to publishing of results, everything works on cruise control.

The automation and regression management systems and methods bring in an innovative, easy to use, manage, execute and interpret test results. The automation and regression management systems and methods allow anybody, from Quality Assurance (QA) to Product Management (PM) teams, to leverage test automation without any learning curve. Advantages of the automation and regression management systems and methods include: 1) Quick Sanity Tests and Regression Tests can be performed against new code base in less time; 2) Easy to use automation without any learning curve; 3) Very easy to use and powerful result interpretation; 4) Compare results against previous software versions; 5) Easy to scale and manage test infrastructure; 6) Dynamic Results for long running tests; and 7) Test Results delivered in user's inbox using email server.

§1.0 Example High Level System Architecture—Cloud-Based Security System

Figure 1:
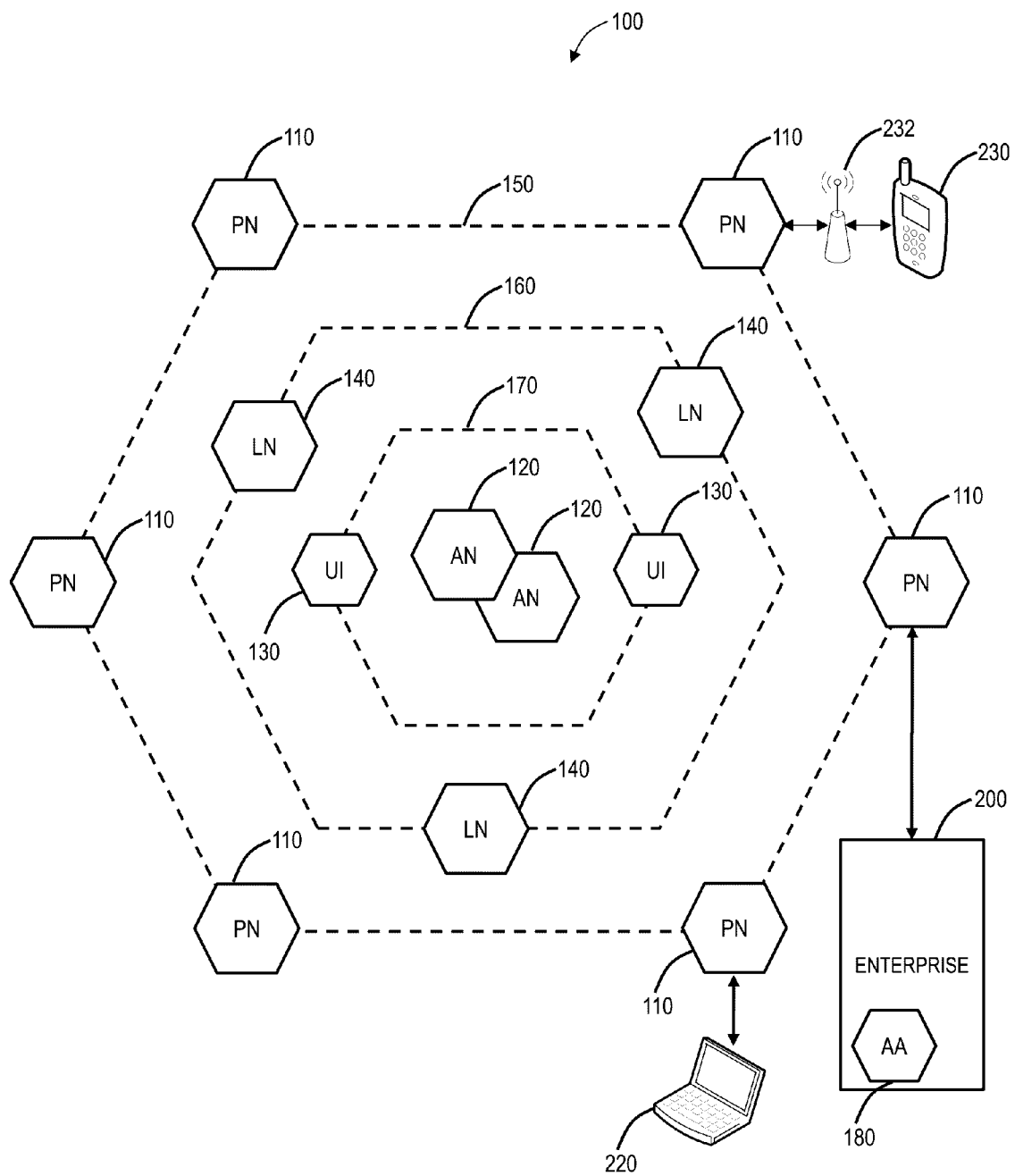
FIG. 1 is a network diagram of a distributed security system that is a cloud system and which can implement the systems and methods.

Referring to FIG. 1, in an exemplary embodiment, a block diagram illustrates a distributed security system 100. The system 100 can, for example, be implemented as an overlay network in a wide area network (WAN), such as the Internet, a local area network (LAN), or the like. Also, the system 100 can utilize the archiving systems and methods described herein. The system 100 includes content processing nodes, processing nodes 110, that proactively detect and preclude the distribution of security threats, e.g., malware, spyware, viruses, trojans, botnets, email spam, data leakage, policy violations, etc., and other undesirable content sent from or requested by an external system. Example external systems can include an enterprise 200, a computer device 220, and a mobile device 230, or any other network and computing systems communicatively coupled to the system 100. In an exemplary embodiment, each of the processing nodes 110 cam include a decision system and method, e.g., data inspection engines that operate on a content item, e.g., a web page, a file, an email message, or some other data or data communication that is sent from or requested by one of the external systems. In an exemplary embodiment, all data destined for or received from the Internet is processed through one of the processing nodes 110. In another exemplary embodiment, specific data specified by each external system, e.g., only email, only executable files, etc., is process through one of the processing node 110.

Each of the processing nodes 110 can generate a decision vector D=[d1, d2, . . . , dn] for a content item of one or more parts C=[c1, c2, . . . , cm]. Each decision vector can identify a threat classification, e.g., clean, spyware, malware, undesirable content, innocuous, spam email, unknown, data leakage, policy violation, etc. For example, the output of each element of the decision vector D can be based on the output of one or more data inspection engines. In an exemplary embodiment, the threat classification can be reduced to a subset of categories e.g., violating, non-violating, neutral, unknown. Based on the subset classification, the processing node 110 can allow distribution of the content item, preclude distribution of the content item, allow distribution of the content item after a cleaning process, or perform threat detection on the content item. In an exemplary embodiment, the actions taken by one of the processing nodes 110 can be determinative on the threat classification of the content item and on a security policy of the external system to which the content item is being sent from or from which the content item is being requested by. A content item is violating if, for any part C=[c1, c2, . . . , cm] of the content item, at any of the processing nodes 110, any one of the data inspection engines generates an output that results in a classification of "violating."

Figure 3:
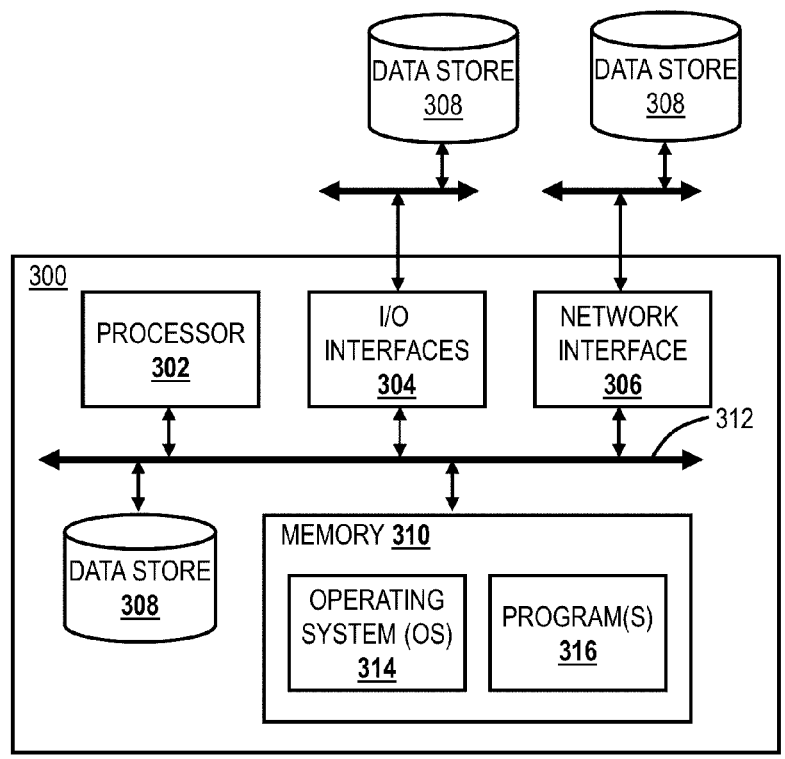
FIG. 3 is a block diagram of a server which may be used in the distributed security system of FIG. 1 or with any other cloud-based system.

Each of the processing nodes 110 can be implemented by one or more of computer and communication devices, e.g., server computers, gateways, switches, etc., such as the server 300 described in FIG. 3. In an exemplary embodiment, the processing nodes 110 can serve as an access layer 150. The access layer 150 can, for example, provide external system access to the security system 100. In an exemplary embodiment, each of the processing nodes 110 can include Internet gateways and one or more servers, and the processing nodes 110 can be distributed through a geographic region, e.g., throughout a country, region, campus, etc. According to a service agreement between a provider of the system 100 and an owner of an external system, the system 100 can thus provide security protection to the external system at any location throughout the geographic region.

Data communications can be monitored by the system 100 in a variety of ways, depending on the size and data requirements of the external system. For example, an enterprise 200 can have multiple routers, switches, etc. that are used to communicate over the Internet, and the routers, switches, etc. can be configured to establish communications through the nearest (in traffic communication time or geographically, for example) processing node 110. A mobile device 230 can be configured to communicate with a nearest processing node 110 through any available wireless access device, such as an access point, high-speed wireless access, or a cellular gateway. A single computer device 220, such as a user's personal computer, can have its browser and email program configured to access the nearest processing node 110, which, in turn, serves as a proxy for the computer device 220. Alternatively, an Internet provider can have all of its customer traffic processed through the processing nodes 110.

In an exemplary embodiment, the processing nodes 110 can communicate with one or more authority nodes (AN) 120. The authority nodes 120 can store policy data for each external system and can distribute the policy data to each of the processing nodes 110. The policy can, for example, define security policies for a protected system, e.g., security policies for the enterprise 200. Example policy data may define access privileges for users, web sites and/or content that is disallowed, restricted domains, acceptable use, data leakage prevention, etc. The authority nodes 120 can distribute the policy data to the processing nodes 110. In an exemplary embodiment, the authority nodes 120 can also distribute threat data that includes the classifications of content items according to threat classifications, e.g., a list of known viruses, a list of known malware sites, spam email domains, a list of known phishing sites, list of data leakage prevention terms, etc. The distribution of threat data between the processing nodes 110 and the authority nodes 120 can implemented by push and pull distribution schemes described in more detail below. In an exemplary embodiment, each of the authority nodes 120 can be implemented by one or more computer and communication devices, e.g., server computers, gateways, switches, etc., such as the server 300 described in FIG. 3. In some exemplary embodiments, the authority nodes 120, the logging nodes 140, and user interface (UI) front-ends 130 can serve as an application layer 160. The application layer 160 can, for example, manage and provide policy data, threat data, and data inspection engines and dictionaries for the processing nodes 110.

Other application layer functions can also be provided in an application layer 170, such as the user interface (UI) front-end 130. The user interface front-end 130 can provide a user interface through which users of the external systems can provide and define security policies, e.g., whether email traffic is to be monitored, whether certain web sites are to be precluded, etc. Another application capability that can be provided through the user interface front-end 130 is security analysis and log reporting. The underlying data on which the security analysis and log reporting functions operates are stored in logging nodes (LN) 140, which serve as a data logging layer, i.e. the application layer 160 can be referred to as the data logging layer. Each of the logging nodes 140 can store data related to security operations and network traffic processed by the processing nodes 110 for each external system. In an exemplary embodiment, the logging node 140 data can be anonymized so that data identifying an enterprise is removed or obfuscated. For example, identifying data can be removed to provide an overall system summary of security processing for all enterprises and users without revealing the identity of any one account. Alternatively, identifying data can be obfuscated, e.g., provide a random account number each time it is accessed, so that an overall system summary of security processing for all enterprises and users may be broken out by accounts without revealing the identity of any one account. In another exemplary embodiment, the identifying data and/or logging node 140 data can be further encrypted, e.g., so that only the enterprise (or user if a single user account) can have access to the logging node 140 data for its account. Other processes of anonymizing, obfuscating, or securing logging node 140 data may also be used. As is described herein, the archiving systems and methods can be implemented with the processing nodes 110, the authority nodes, and the logging nodes 140 to ensure that no private data is stored in the system 100.

In an exemplary embodiment, an access agent 180 can be included in the external systems. For example, the access agent 180 is deployed in the enterprise 200. The access agent 180 can, for example, facilitate security processing by providing a hash index of files on a client device to one of the processing nodes 110, or can facilitate authentication functions with one of the processing nodes 110, e.g., by assigning tokens for passwords and sending only the tokens to a processing node so that transmission of passwords beyond the network edge of the enterprise is minimized. Other functions and processes can also be facilitated by the access agent 180. In an exemplary embodiment, the processing node 110 can act as a forward proxy that receives user requests to external servers addressed directly to the processing node 110. In another exemplary embodiment, the processing node 110 can access user requests that are passed through the processing node 110 in a transparent mode. A protected system, e.g., enterprise 200, can, for example, choose one or both of these modes. For example, a browser can be configured either manually or through the access agent 180 to access the processing node 110 in a forward proxy mode. In the forward proxy mode, all accesses are addressed to the processing node 110.

In an exemplary embodiment, an enterprise gateway can be configured so that user requests are routed through the processing node 110 by establishing a communication tunnel between enterprise gateways and the processing node 110. For establishing the tunnel, existing protocols such as generic routing encapsulation (GRE), layer two tunneling protocol (L2TP), or other Internet Protocol (IP) security protocols can be used. In another exemplary embodiment, the processing nodes can may be deployed on Internet service provider (ISP) nodes. The ISP nodes can redirect subject traffic to the processing nodes 110 in a transparent proxy mode. Protected systems, such as the enterprise 200, can use a multiprotocol label switching (MPLS) class of service for indicating the subject traffic that is to be redirected. For example, at the within the enterprise the access agent 180 can be configured to perform MPLS labeling. In another transparent proxy mode exemplary embodiment, a protected system, such as the enterprise 200, can identify the processing node 110 as a next hop router for communication with the external servers.

Generally, the distributed security system 100 is an exemplary cloud based system. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, with no installed client version of an application required. Centralization gives cloud service providers complete control over the versions of the browser-based applications provided to clients, which removes the need for version upgrades or license management of individual client computing devices. The phrase "software as a service" (SaaS) is sometimes used to describe application programs offered through cloud computing. A common shorthand for a provided cloud computing service (or even an aggregation of all existing cloud services) is "the cloud." The distributed security system 100 is illustrated herein as one exemplary embodiment of a cloud based system, and those of ordinary skill in the art will recognize the archiving systems and methods contemplate operation on or with any cloud based system.

Operationally, the system 100 can provide policy-based, secure Internet access to any device, anywhere. The system 100 can be viewed as a cloud based security system. Traditionally, security was delivered as software which was installed on the servers. Installation and deployment required time and expertise, prompting the migration to appliances. While the hardware simply plugs into existing infrastructures, multiple appliances must be installed at each gateway and an assortment of point products must be used to provide comprehensive security. Managing multiple user interfaces, policy managers, and log files is expensive, inefficient, and incomplete. In contrast, the system 100 provides SaaS, or cloud-delivered, security services. By analogy, rather than cleaning one's own water, one prefers water delivered through a tap on-demand; rather than generating one's own power, one prefers power delivered through power lines on-demand. In the same way, appliances are giving way to security as a service.

Using the system 100, IT administrators or the like define policies and simply forward corporate Internet traffic to the system 100. The system 100 allows or blocks the traffic and can be used for all users, including the enterprise 200, the computer device 220, and the mobile device 230. The enterprise 200 can include an organization's home and regional offices, the computer device 220 and the mobile device 230 can include road warriors, mobile phone users, home-based employees, etc. Specifically, users such as the enterprise 200, the computer device 220, and the mobile device 230 are all accessing external systems, e.g. the Internet, by way of the system 100, i.e. through one of the processing nodes 110. As such, security for the users 200, 220, 230 is pervasive and always present. There is no capital expenditure as investments are not required for either hardware or software at the users 200, 220, 230. SaaS and the system 100 frees precious IT resources from performing operational security chores of managing and patching boxes, and updating data feeds and signatures. It enables IT to focus on strategic security, such as policy and architecture.

§2.0 Example Detailed System Architecture and Operation

Figure 2:
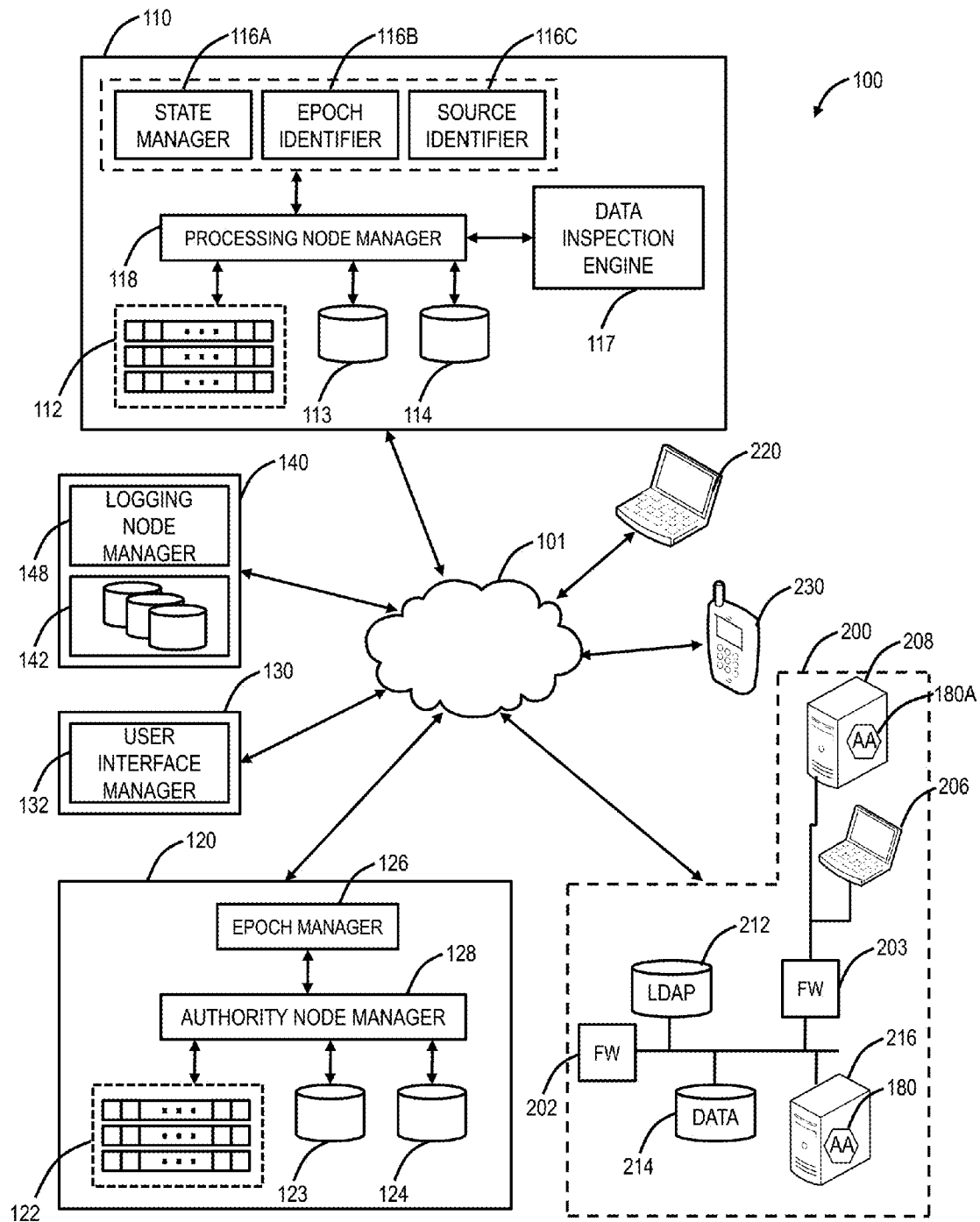
FIG. 2 is a network diagram of the distributed security system of FIG. 1 illustrating various components in more detail.

Referring to FIG. 2, in an exemplary embodiment, a block diagram illustrates various components of the distributed security system 100 in more detail. Although FIG. 2 illustrates only one representative component processing node 110, authority node 120 and logging node 140, those of ordinary skill in the art will appreciate there can be many of each of the component nodes 110, 120 and 140 present in the system 100. A wide area network (WAN) 101, such as the Internet, or some other combination of wired and/or wireless networks, communicatively couples the processing node 110, the authority node 120, and the logging node 140 therebetween. The external systems 200, 220 and 230 likewise communicate over the WAN 101 with each other or other data providers and publishers, i.e. any content on any network. Some or all of the data communication of each of the external systems 200, 220 and 230 may be processed through the processing node 110.

FIG. 2 also shows the enterprise 200 in more detail. The enterprise 200 can, for example, include a firewall (FW) 202 protecting an internal network that may include one or more enterprise servers 216, a lightweight directory access protocol (LDAP) server 212, and other data or data stores 214. Another firewall 203 can protect an enterprise subnet that can include user computers 206 and 208 (e.g., laptop and desktop computers). The enterprise 200 can communicate with the WAN 101 through one or more network devices, such as a router, gateway, switch, etc. The LDAP server 212 can store, for example, user login credentials for registered users of the enterprise 200 system. Such credentials can include a user identifiers, login passwords, and a login history associated with each user identifier. The other data stores 214 can include sensitive information, such as bank records, medical records, trade secret information, or any other information warranting protection by one or more security measures.

In an exemplary embodiment, a client access agent 180*a* can be included on a client computer 208. The client access agent 180*a* can, for example, facilitate security processing by providing a hash index of files on the user computer 208 to a processing node 110 for malware, virus detection, etc. Other security operations can also be facilitated by the access agent 180*a*. In another exemplary embodiment, a server access agent 180 can facilitate authentication functions with the processing node 110, e.g., by assigning tokens for passwords and sending only the tokens to the processing node 110 so that transmission of passwords beyond the network edge of the enterprise 200 is minimized. Other functions and processes can also be facilitated by the server access agent 180*b*. The computer device 220 and the mobile device 230 can also store information warranting security measures, such as personal bank records, medical information, and login information, e.g., login information to the server 206 of the enterprise 200, or to some other secured data provider server.

§2.1 Example Processing Node Architecture

In an exemplary embodiment, the processing nodes 110 are external to network edges of the external systems 200, 220 and 230. That is, the processing nodes 110 are connected to the external systems 200, 220 and 230, and not physically part thereof. For example, the processing nodes 110 could be located in data centers and the like and the external systems 200, 220 and 230 can connect to the processing nodes 110 through various networks over various network connectivity types (e.g., wireless, wired). Each of the processing nodes 110 stores security policies 113 received from the authority node 120 and monitors content items requested by or sent from the external systems 200, 220 and 230. In an exemplary embodiment, each of the processing nodes 110 can also store a detection process filter 112 and/or threat data 114 to facilitate the decision of whether a content item should be processed for threat detection. A processing node manager 118 can manage each content item in accordance with the security policy data 113, and the detection process filter 112 and/or threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item can be allowed, precluded, or threat detected. In general, content items that are already classified as "clean" or not posing a threat can be allowed, while those classified as "violating" may be precluded. Those content items having an unknown status, e.g., content items that have not been processed by the system 100, may be threat detected to classify the content item according to threat classifications.

The processing node 110 can include a state manager 116A. The state manager 116A can be used to maintain the authentication and the authorization states of users that submit requests to the processing node 110. Maintenance of the states through the state manager 116A can minimize the number of authentication and authorization transactions that are necessary to process a request. An example of this state management is described in commonly assigned U.S. patent application Ser. No. 12/179,377, filed Jul. 24, 2008, and entitled "HTTP AUTHENTICATION AND AUTHORIZATION MANAGEMENT," the contents of which are incorporated by reference herein. The processing node 110 can also include an epoch processor 116B. The epoch processor 116B can be used to analyze authentication data that originated at the authority node 120. The epoch processor 116B can use an epoch ID to further validate the authenticity of authentication data. The processing node 110 can further include a source processor 116C. The source processor 116C can be used to verify the source of authorization and authentication data. The source processor 116C can identify improperly obtained authorization and authentication data, enhancing the security of the network. Collectively, the state manager 116A, the epoch processor 116B, and the source processor 116C operate as data inspection engines.

Because the amount of data being processed by the processing nodes 110 can be substantial, the detection processing filter 112 can be used as the first stage of an information lookup procedure. For example, the detection processing filter 112 can be used as a front end to the threat data 114. Content items can be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence. Each content item may have an information key that is hashed. For example, the processing node manager 118 can identify the Uniform Resource Locator (URL) address of URL requests as the information key and hash the URL address; or can identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 can improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 thus improves performance of queries where the answer to a request for information is usually positive. Such instances can include, for example, whether a given file has been virus scanned, whether content at a given URL has been scanned for inappropriate (e.g., pornographic) content, whether a given fingerprint matches any of a set of stored documents, whether data contains data leakage prevention terms, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information. In an exemplary embodiment, the detection processing filter 112 can be a Bloom filter implemented by a single hash function. The Bloom filter can be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

§2.2 Example Authority Node Architecture

In general, the authority node 120 includes a data store that stores master security policy data 123 for each of the external systems 200, 220 and 230. An authority node manager 128 may be used to manage the master security policy data 123, e.g., receive input from users of each of the external systems, defining different security policies, and may distribute the master security policy data 123 to each of the processing nodes 110. The processing nodes 110 then store a local copy of the security policy data 113. The authority node 120 may also store a master detection process filter 122. The detection processing filter 122 may include data indicating whether content items have been processed by one or more of the data inspection engines 116 in any of the processing nodes 110. The authority node manager 128 may be used to manage the master detection processing filter 122, e.g., receive updates from a processing node 110 when the processing node 110 has processed a content item and update the master detection processing filter 122. For example, the master detection processing filter 122 can be distributed to the processing nodes 110, which then store a local copy of the detection processing filter 112.

In an exemplary embodiment, the authority node 120 can include an epoch manager 126. The epoch manager 126 can be used to generate authentication data associated with an epoch ID. The epoch ID of the authentication data is a verifiable attribute of the authentication data that can be used to identify fraudulently created authentication data. In an exemplary embodiment, the detection processing filter 122 can be a guard table. The processing node 110 can, for example, use the information in the local detection processing filter 112 to quickly determine the presence and/or absence of information, e.g., whether a particular URL has been checked for malware; whether a particular executable has been virus scanned, etc. The authority node 120 can also store master threat data 124. The master threat data 124 can classify content items by threat classifications, e.g., a list of known viruses, a list of known malware sites, spam email domains, list of known or detected phishing sites, data leakage terms, etc. The authority node manager 128 can be used to manage the master threat data 124, e.g., receive updates from the processing nodes 110 when one of the processing nodes 110 has processed a content item and update the master threat data 124 with any pertinent results. In some implementations, the master threat data 124 can be distributed to the processing nodes 110, which then store a local copy of the threat data 114. In another exemplary embodiment, the authority node 120 can also monitor the health of each of the processing nodes 110, e.g., the resource availability in each of the processing nodes 110, detection of link failures, etc. Based on the observed health of each of the processing nodes 110, the authority node 120 can redirect traffic between the processing nodes 110 and/or balance traffic among the processing nodes 110. Other remedial actions and processes can also be facilitated by the authority node 110.

§2.3 Example Processing Node and Authority Node Communications

The processing node 110 and the authority node 120 can be configured according to one or more push and pull processes to manage content items according to security policy data 113 and/or 123, detection process filters 112 and/or 122, and the threat data 114 and/or 124. In a threat data push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 can manage the content item according to the security classification of the content item and the security policy of the external system. If, however, the content item is determined to not be classified by the threat data 114, then the processing node manager 118 can cause one or more of the data inspection engines 117 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120.

The authority node manager 128, in response to receiving the threat data update, updates the master threat data 124 stored in the authority node data store, according to the threat data update received from the processing node 110. In an exemplary embodiment, the authority node manager 128 can automatically transmit the updated threat data to the other processing nodes 110. Accordingly, threat data for new threats as the new threats are encountered are automatically distributed to each processing node 110. Upon receiving the new threat data from the authority node 120, each of processing node managers 118 can store the updated threat data in the locally stored threat data 114. In a threat data pull and push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 can manage the content item according to the security classification of the content item and the security policy of the external system. If, however, the content item is determined to not be classified by the threat data, then the processing node manager 118 can request responsive threat data for the content item from the authority node 120. Because processing a content item can consume valuable resource and time, in some implementations the processing node 110 can first check with the authority node 120 for threat data 114 before committing such processing resources.

The authority node manager 128 can receive the responsive threat data request from the processing node 110 and can determine if the responsive threat data is stored in the authority node data store. If responsive threat data is stored in the master threat data 124, then the authority node manager 128 provide a reply that includes the responsive threat data to the processing node 110 so that the processing node manager 118 can manage the content item in accordance with the security policy data 112 and the classification of the content item. Conversely, if the authority node manager 128 determines that responsive threat data is not stored in the master threat data 124, then the authority node manager 128 can provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests related to responsive threat data for the content item from other processing nodes 110 can be readily served with responsive threat data.

In a detection process filter and threat data push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it can determine if the content item is classified by the threat data 114. Because the detection process filter 112 has the potential for a false positive, a lookup in the threat data 114 can be implemented to ensure that a false positive has not occurred. The initial check of the detection process filter 112, however, can eliminate many null queries to the threat data 114, which, in turn, conserves system resources and increases efficiency. If the content item is classified by the threat data 114, then the processing node manager 118 can manage the content item in accordance with the security policy data 113 and the classification of the content item. Conversely, if the processing node manager 118 determines that the content item is not classified by the threat data 114, or if the processing node manager 118 initially determines through the detection process filter 112 that the content item is not classified by the threat data 114, then the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to one of the authority nodes 120.

The authority node manager 128, in turn, can update the master threat data 124 and the master detection process filter 122 stored in the authority node data store according to the threat data update received from the processing node 110. In an exemplary embodiment, the authority node manager 128 can automatically transmit the updated threat data and detection processing filter to other processing nodes 110. Accordingly, threat data and the detection processing filter for new threats as the new threats are encountered are automatically distributed to each processing node 110, and each processing node 110 may update its local copy of the detection processing filter 112 and threat data 114. In a detection process filter and threat data pull and push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it can determine if the content item is classified by the threat data 114. Because the detection process filter 112 has the potential for a false positive, a lookup in the threat data 114 can be implemented to ensure that a false positive has not occurred. The initial check of the detection process filter 112, however, can eliminate many null queries to the threat data 114, which, in turn, conserves system resources and increases efficiency. If the processing node manager 118 determines that the content item has not been processed, it can request responsive threat data for the content item from the authority node 120. Because processing a content item may consume valuable resource and time, in some implementations the processing node 110 can first check with the authority node 120 for threat data 114 before committing such processing resources.

The authority node manager 128 can receive the responsive threat data request from the processing node 110 and can determine if the responsive threat data is stored in the authority node data 120 store. If responsive threat data is stored in the master threat data 124, then the authority node manager 128 provides a reply that includes the responsive threat data to the processing node 110 so that the processing node manager 118 can manage the content item in accordance with the security policy data 112 and the classification of the content item, and further update the local detection processing filter 112. Conversely, if the authority node manager 128 determines that responsive threat data is not stored in the master threat data 124, then the authority node manager 128 can provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests for related to responsive threat data for the content item from other processing nodes 110 can be readily served with responsive threat data.

The various push and pull data exchange processes provided above are exemplary processes for which the threat data and/or detection process filters may be updated in the system 100 of FIGS. 1 and 2. Other update processes, however, are contemplated herewith. The data inspection engines 116, processing node manager 118, authority node manager 128, user interface manager 132, logging node manager 148, and authority agent 180 can be realized by instructions that upon execution cause one or more processing devices to carry out the processes and functions described above. Such instructions can, for example, include interpreted instructions, such as script instructions, e.g., JavaScript or ECMAScript instructions, or executable code, or other instructions stored in a non-transitory computer readable medium. Other processing architectures can also be used, e.g., a combination of specially designed hardware and software, for example.

§3.0 Exemplary Server Architecture

Referring to FIG. 3, in an exemplary embodiment, a block diagram illustrates a server 300 which can be used in the system 100 or standalone. Any of the processing nodes 110, the authority nodes 120, and the logging nodes 140 can be formed through one or more servers 300. Further, the computer device 220, the mobile device 230, the servers 208, 216, etc. can include the server 300 or a similar structure. The server 300 can be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 can include address, control, and/or data connections to enable appropriate communications between the aforementioned components.

The processor 302 is a hardware device for executing software instructions. The processor 302 can be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 can be used to receive user input from and/or for providing system output to one or more devices or components. User input can be provided via, for example, a keyboard, touch pad, and/or a mouse. System output can be provided via a display device and a printer (not shown). I/O interfaces 304 can include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 can be used to enable the server 300 to communicate on a network, such as the Internet, the WAN 101, the enterprise 200, and the like, etc. The network interface 306 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 can include address, control, and/or data connections to enable appropriate communications on the network. A data store 308 can be used to store data. The data store 308 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 can incorporate electronic, magnetic, optical, and/or other types of storage media. In one example, the data store 308 can be located internal to the server 300 such as, for example, an internal hard drive connected to the local interface 312 in the server 300. Additionally, in another embodiment, the data store 308 can be located external to the server 300 such as, for example, an external hard drive connected to the I/O interfaces 304 (e.g., SCSI or USB connection). In a further embodiment, the data store 308 can be connected to the server 300 through a network, such as, for example, a network attached file server.

The memory 310 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 can incorporate electronic, magnetic, optical, and/or other types of storage media. Note that the memory 310 can have a distributed architecture, where various components are situated remotely from one another, but can be accessed by the processor 302. The software in memory 310 can include one or more software programs, each of which includes an ordered list of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The operating system 314 can be any of Windows NT, Windows 2000, Windows XP, Windows Vista, Windows 7, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), Android and variants thereof (available from Google, Inc. of Mountain View, Calif.), Apple OS X and variants thereof (available from Apple, Inc. of Cupertino, Calif.), or the like. The one or more programs 316 may be configured to implement the various processes, algorithms, methods, techniques, etc. described herein.

§4.0 Exemplary Mobile Device Architecture

Figure 4:
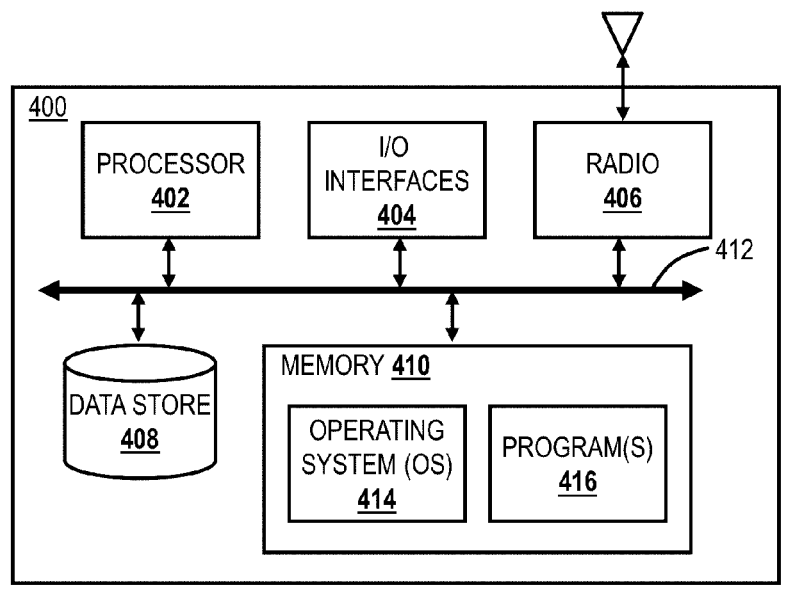
FIG. 4 is a block diagram of a mobile device which may be used in the distributed security system of FIG. 1 or with any other cloud-based system.

Referring to FIG. 4, in an exemplary embodiment, a block diagram illustrates a mobile device 400, which can be used in the system 100 or the like. The mobile device 400 can be a digital device that, in terms of hardware architecture, generally includes a processor 412, input/output (I/O) interfaces 414, a radio 416, a data store 418, and memory 422. It should be appreciated by those of ordinary skill in the art that FIG. 4 depicts the mobile device 400 in an oversimplified manner, and a practical embodiment can include additional components and suitably configured processing logic to support known or conventional operating features that are not described in detail herein. The components (412, 414, 416, 418, and 422) are communicatively coupled via a local interface 424. The local interface 424 can be, for example, but not limited to, one or more buses or other wired or wireless connections, as is known in the art. The local interface 424 can have additional elements, which are omitted for simplicity, such as controllers, buffers (caches), drivers, repeaters, and receivers, among many others, to enable communications. Further, the local interface 424 may include address, control, and/or data connections to enable appropriate communications between the aforementioned components.

The processor 412 is a hardware device for executing software instructions. The processor 412 can be any custom made or commercially available processor, a central processing unit (CPU), an auxiliary processor among several processors associated with the mobile device 400, a semiconductor-based microprocessor (in the form of a microchip or chip set), or generally any device for executing software instructions. When the mobile device 400 is in operation, the processor 412 is configured to execute software stored within the memory 422, to communicate data to and from the memory 422, and to generally control operations of the mobile device 400 pursuant to the software instructions. In an exemplary embodiment, the processor 412 may include a mobile optimized processor such as optimized for power consumption and mobile applications. The I/O interfaces 414 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 414 can also include, for example, a serial port, a parallel port, a small computer system interface (SCSI), an infrared (IR) interface, a radio frequency (RF) interface, a universal serial bus (USB) interface, and the like. The I/O interfaces 414 can include a graphical user interface (GUI) that enables a user to interact with the mobile device 400. Additionally, the I/O interfaces 414 may further include an imaging device, i.e. camera, video camera, etc.

The radio 416 enables wireless communication to an external access device or network. Any number of suitable wireless data communication protocols, techniques, or methodologies can be supported by the radio 416, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 418 can be used to store data. The data store 418 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 418 can incorporate electronic, magnetic, optical, and/or other types of storage media.

The memory 422 can include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 422 may incorporate electronic, magnetic, optical, and/or other types of storage media. Note that the memory 422 can have a distributed architecture, where various components are situated remotely from one another, but can be accessed by the processor 412. The software in memory 422 can include one or more software programs, each of which includes an ordered list of executable instructions for implementing logical functions. In the example of FIG. 4, the software in the memory system 422 includes a suitable operating system (O/S) 426 and programs 428. The operating system 426 essentially controls the execution of other computer programs, and provides scheduling, input-output control, file and data management, memory management, and communication control and related services. The operating system 426 can be any of LINUX (or another UNIX variant), Android (available from Google), Symbian OS, Microsoft Windows CE, Microsoft Windows 7 Mobile, iOS (available from Apple, Inc.), webOS (available from Hewlett Packard), Blackberry OS (Available from Research in Motion), and the like. The programs 428 can include various applications, add-ons, etc. configured to provide end user functionality with the mobile device 400. For example, exemplary programs 428 can include, but not limited to, a web browser, social networking applications, streaming media applications, games, mapping and location applications, electronic mail applications, financial applications, and the like.

§5.0 Exemplary General Cloud System

Figure 5:
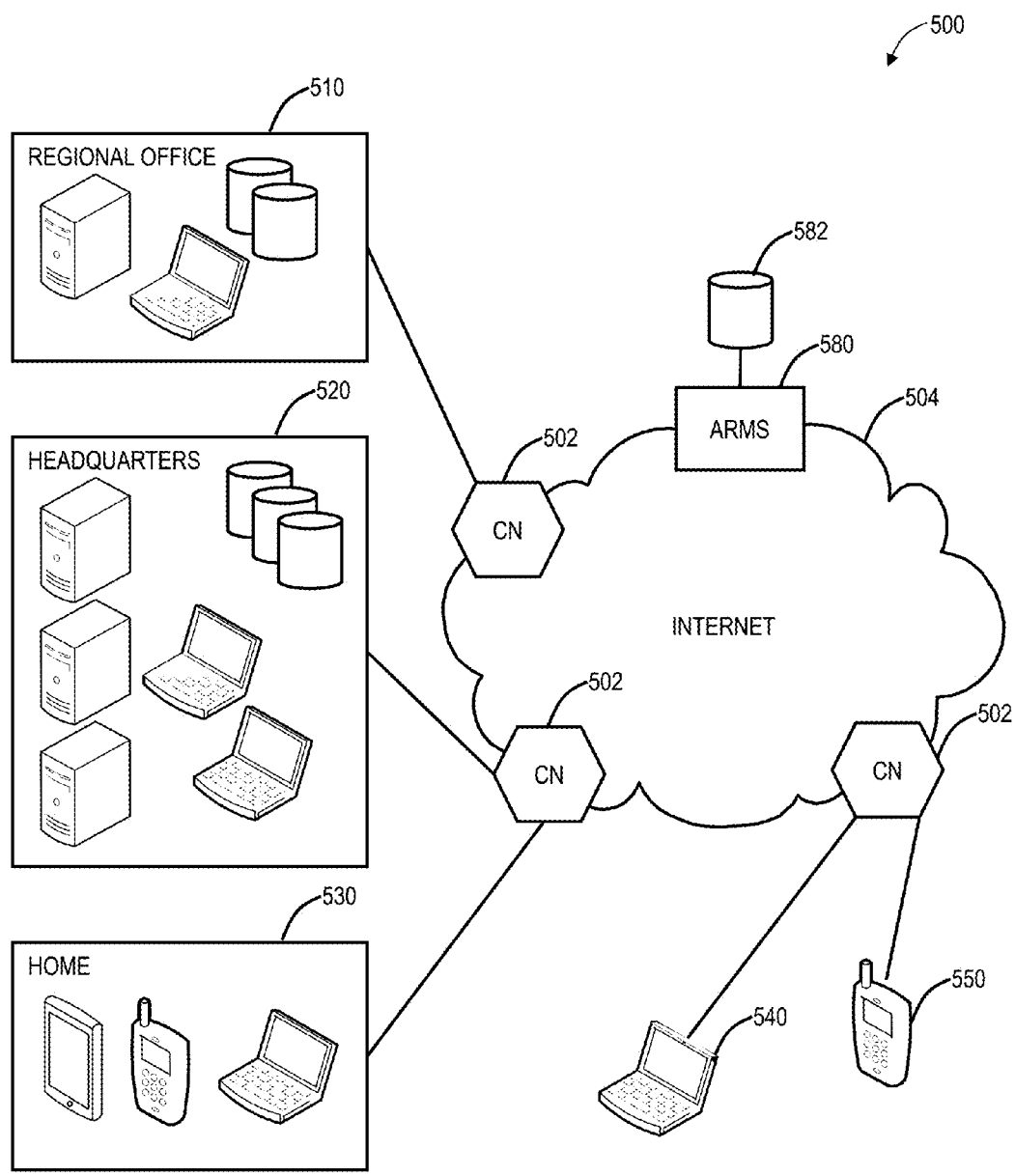
FIG. 5 is a network diagram of another cloud system which can implement the systems and methods.

Referring to FIG. 5, in an exemplary embodiment, another exemplary cloud system 500 is illustrated for the systems and methods and the like. The cloud system 500 includes one or more cloud nodes (CN) 502 communicatively coupled to the Internet 504. The cloud nodes 502 may include the processing nodes 110, the server 300, or the like. That is, the cloud system 500 may include the distributed security system 100 or another implementation of a cloud based system. In the cloud system 500, traffic from various locations (and various devices located therein) such as a regional office 510, headquarters 520, various employees' homes 530, a mobile laptop 540, and a mobile device 550 is redirected to the cloud through the cloud nodes 502. That is, each of the locations 510, 520, 530, 540, 550 is communicatively coupled to the Internet 504 through the cloud nodes 502. The cloud system 500 can be configured to perform various functions such as spam filtering, uniform resource locator (URL) filtering, antivirus protection, bandwidth control, data loss prevention, zero day vulnerability protection, web 2.0 features, and the like. In an exemplary embodiment, the cloud system 500 and the distributed security system 100 can be viewed as Security-as-a-Service through the cloud.

Architecturally, the systems 100, 500 generally at least include the processing nodes 110 and the cloud nodes 502 for interfacing with the users 200, 220, 230, 510, 520, 530, 540, 550. In an exemplary embodiment, all functions described herein can be incorporated in the processing nodes 110 and the cloud nodes 502. In another exemplary embodiment, the functions can be distributed. For example, the system 500 includes the singular cloud nodes 502 while the system 100 includes the processing nodes 110, the authority nodes 120, the logging nodes 140, etc. The term node as used herein can be a single computer, a cluster of servers, or a functional module running on a computer, server, etc. The systems and methods can be implemented generally with the distributed security system 100 and/or the cloud system 500. For example, the systems and methods can operate on the processing nodes 110, the authority nodes 120, the user interface front-end 130, and the logging nodes 140 to ensure data archiving adheres to data protection policies of an organization using the system 100. Alternatively, the archiving systems and methods can affect the cloud nodes 502 ensuring that any data storage thereon adheres to data protection policies of an organization using the system 500.

§5.1 Automation and Regression Management System

The cloud system 500, as well as the distributed security system 100, can include an Automation and Regression Management System (ARMS) 580 which includes or is communicatively coupled to a database 582. The ARMS 580 contemplates implementation through one or more of the servers 300. Alternatively, the ARMS 580 can be implemented as a service on one of the cloud nodes 502, the processing nodes 110, the authority nodes 120, the logging nodes 140, etc. The ARMS 580 is a client-based system that includes a Web interface with a user interface and a management interface, a server, and the database 582. The ARMS 580 is a multi-tenant system where multiple users can run parallel test automation against different test clouds. It provides real time status of the test run and test progress reporting. It is possible to abort a test run in-between if so desired, without worrying about the consistency of the test cloud. Any kind of automation scripts, i.e. PERL, Python, Java, etc., can be run using the ARMS 580. The ARMS 580 maintains detailed logs for debugging purpose and summary logs for overall information. A user is updated with latest progress pertaining to their test run using email updates or the like.

The ARMS 580 can be accessed by users or administrators via an HTTP/HTTPS interface. The Web interface of the ARMS 580 includes the management interface which allows the users or administrators to manage the automation infrastructure, including i) managing Test Packages: Create Test Packages, Add/Delete scripts to Test Packages; ii) managing Test Beds: Associate new test beds to the ARMS 580, Add/Delete nodes to Test Beds; iii) Build Servers: Associate new build servers to the ARMS 580; and iv) associating Test beds to test packages and software versions. The User Interface is the user interactive part of the ARMS 580. Users can login to the ARMS 580 using this web interface and perform the following tasks: i) Schedule an Automated Test Run against a test bed and software build of choice; and ii) Compile a new software build from the latest code in subversion and start automated tests against this build. The ARMS 580 also includes a Reporting Interface providing tools that can be used by an end user to analyze test results, compare test results against previous builds. The user can drill down to the level of a single test case and co-relate its results against tests run on previous software versions. The Reporting Interface can include: i) Results Dashboard; ii) Test Run Timeline; iii) Test Results Summary; iv) Results Drill Down; v) Test Case History; vi) Results across different software versions; and vii) Detailed Logs. The server (or servers) for the ARMS 580 includes all the logic needed to compile a software build, upgrade test clouds with latest software build, schedule and execute test runs. The database 582 includes all the information related to test beds, automation scripts and results are stored therein.

§6.0 Automation and Regression Management Process

Figure 6:
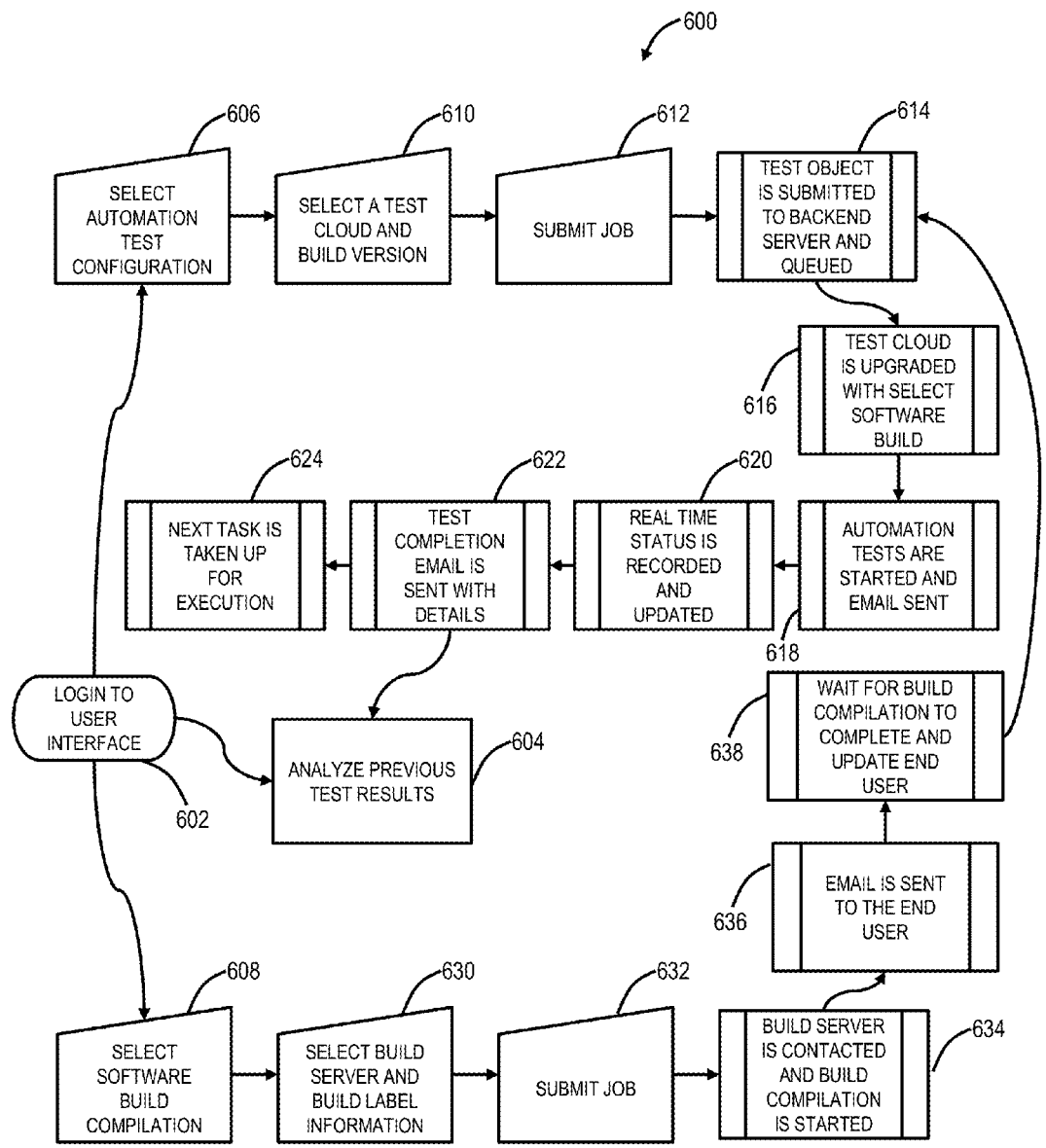
FIG. 6 is a flow chart of an automation and regression management process 600 implementable in the automation and regression management system in FIG. 5.

Referring to FIG. 6, in an exemplary embodiment, a flow chart illustrates an automation and regression management process 600 implementable in the ARMS 580. In some exemplary embodiments, more or fewer steps could be included in the automation and regression management process 600. The ARMS 580 and the automation and regression management process 600 support automated test runs, build compilations, and build installations. The automated test runs generally include scripts to perform tests on installed software on the nodes, such as the nodes 110, 120, 140, 502, etc. The build compilations generally include a compilation function turning source files into directly executable or intermediate objects. For complex software, the source code may include many files and may be combined in different ways to produce many different versions. The process of building a computer program is usually managed by a build tool, a program that coordinates and controls other programs. If the source code in a particular file has not changed then it may not need to be recompiled (may not rather than need not because it may itself depend on other files that have changed). Sophisticated build utilities and linkers attempt to refrain from recompiling code that does not need it, to shorten the time required to complete the build. Modern build utilities may be partially integrated into revision control programs like Subversion. A more complex process may involve other programs producing code or data in the build process. The build installations can include installing complied builds on the nodes.

The automation and regression management process 600 begins with a user logging into the User Interface (step 602). From the User Interface, the user can analyze previous test results for test result analysis and comparison against old builds (step 604), select automation test configuration to start component based automation tests on selected builds against appropriate test beds (step 606), select software build compilation against selected build servers (step 608), or build an installation on selected test beds and nodes.

For the automated test runs (step 606), the automation and regression management process 600 includes selecting a test cloud and build version, to determine which node and software build is automated for test (step 610), and submitting the job for a test object based on the selected build version (step 612). The test object is submitted through the ARMS 580 and queued (step 614). The selected node, test cloud, is upgraded with the selected software build (step 616), and the automation tests are started and the user is contacted, such as through an email or the like (step 618). The real time status of the automation tests is recorded and updated by the ARMS 580 (step 620), and once complete, the user is contacted with the details such as through an email (step 622). At this point, the ARMS 580 can take up the next task for execution (step 624) and the user can analyze the previous test results (step 604).

For the automated test runs (step 606), the user can easily run automated tests from the User Interface. The User Interface can include a widget or the like to help the user choose an appropriate test package, component, test bed and build to be tested. Also, the ARMS 580 can run parallel test runs against different test beds at the same time, but only one test run should be allowed against a single test bed at one time. If a test bed is already busy, any other test run supposed to be run against that system is queued (step 614). The user can be intimated with an email about the start and completion of a test run.

For the build compilation (step 608), the automation and regression management process 600 includes selecting a build server and build label information (step 630) and submitting the job (step 632). The build server is contacted and the build compilation is started (step 634), the user is contacted, such as through an email (step 636), and, when the build compilation is completed, the user is updated (step 638). Subsequently, the automation and regression management process 600 goes to the step 614.

For the Build Compilation, a can be provided enabling a user to select: a) a build server; b) branch; c) label; and d) Full Build Option. Upon selecting a build server, the user should be informed if the build server is already busy with compilation. An email or the like is sent to the user upon submitting a new build and upon the completion of compilation task. The email can contain the subversion (SVN) log reflecting differentials changes included in the new software build. If compilation fails due to an error, the email will be sent to the user with the cause of the failure.

For a build installation, the user can select a test bed and build to be installed on the test bed. There is an option to select particular nodes of the test bed where the build is to be installed. The user is able to select a custom build or a standard build for installation, and an email is sent to the user once build installation is complete.

In the step 604, a results analysis can be performed where run time results are provided in summary or details. The summary results can include overall statistics including: i) Total Test Cases, ii) Passed, iii) Failed, and iv) Pending. The detailed results can include links to detailed debug logs for the test scripts that are or were executed. A time tracking graph can provide details on how much time is utilized per script. Also, an interface can compare test case results against previous software builds.

Figure 7:
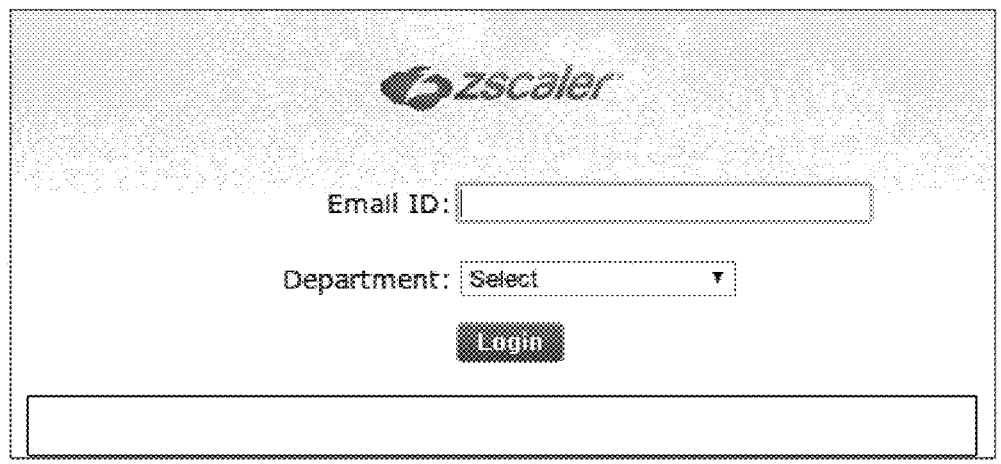
FIG. 7 is a screen shot of the User Interface for the automation and regression management system in FIG. 5.
Figure 8:
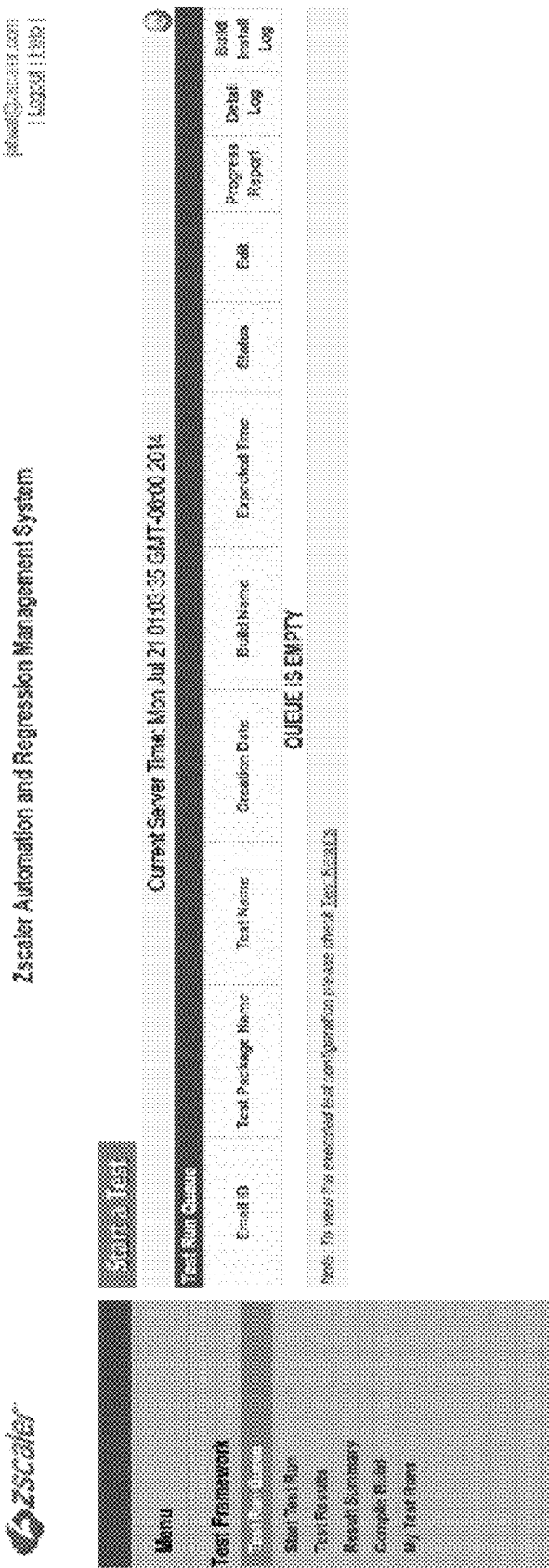
FIG. 8 is a screen shot of a test run queue for the automation and regression management system in FIG. 5.
Figure 9:
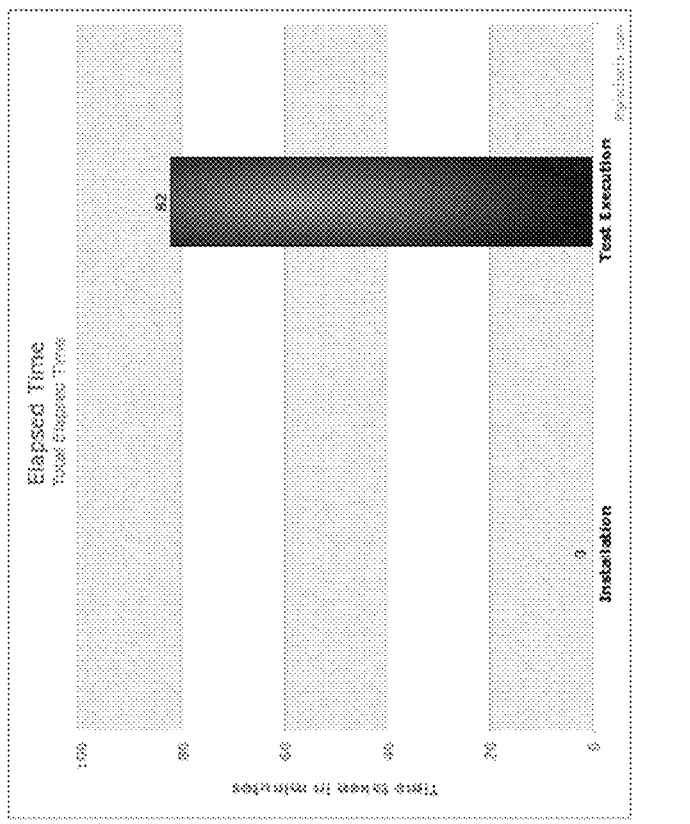
FIG. 9 is a screen shot of the Results Summary in a summary view of the automation and regression management system in FIG. 5.
Figure 9:
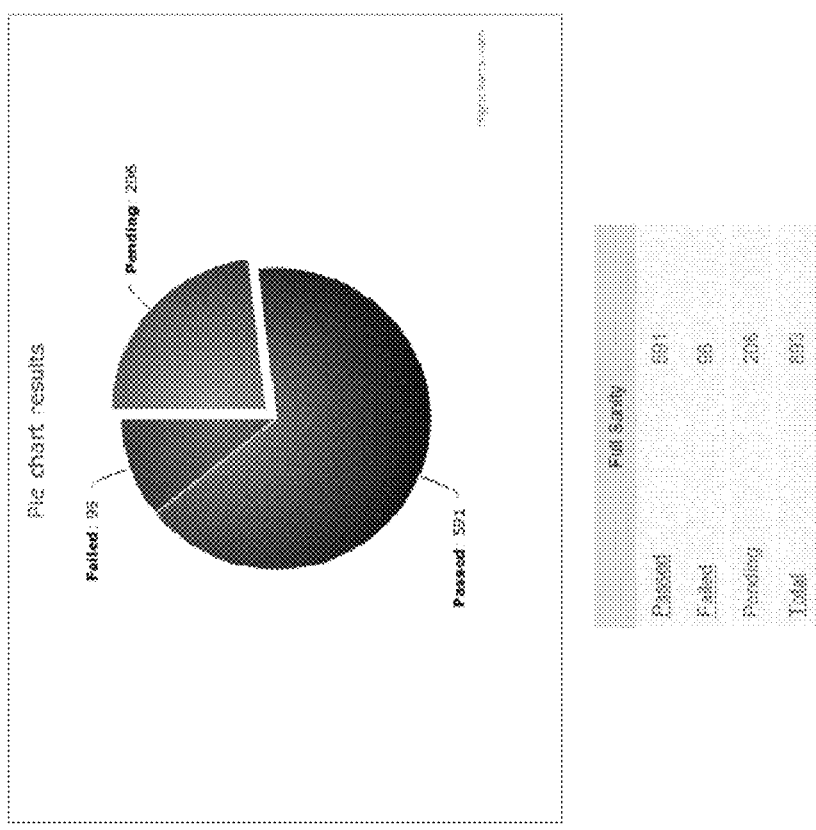
Figure 10:
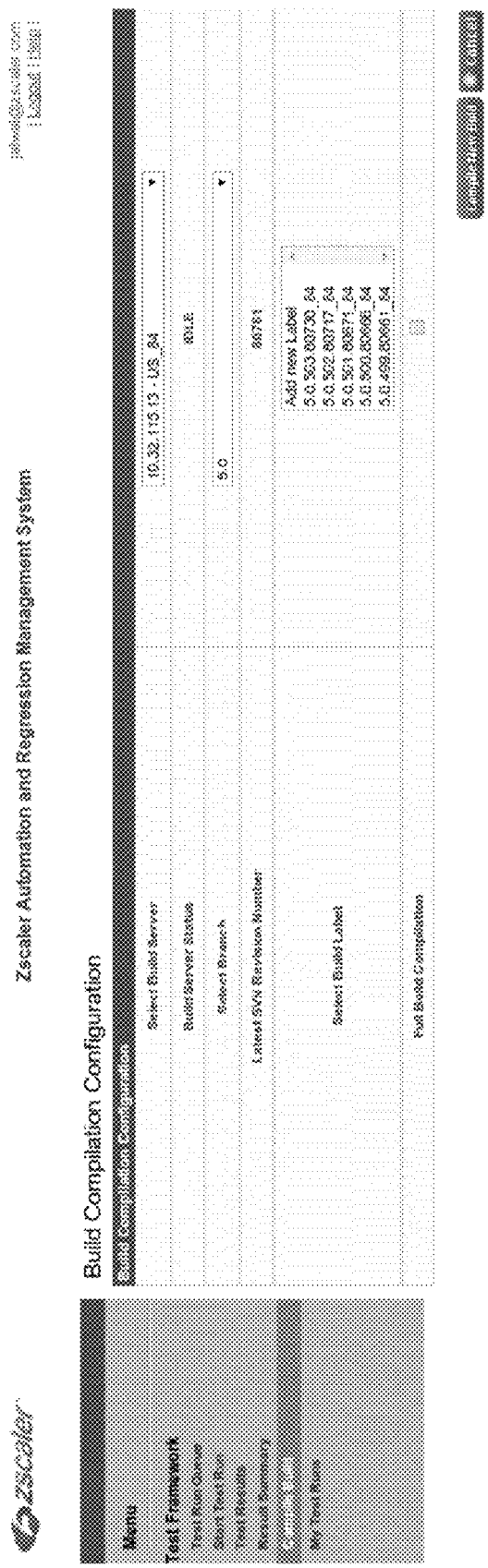
FIG. 10 is a screen shot of a build compilation configuration for the automation and regression management system in FIG. 5.

The database 582 holds all the test bed information, test packages, test scripts, build servers and test results. It also holds user accounts and test runs. FIG. 7 is a screen shot of the User Interface for the ARMS 580. FIG. 8 is a screen shot of a test run queue for the ARMS 580. The test run queue can include all of the tests that can be implemented by the ARMS 580—automated test runs, build compilations, and build installations. On the left side of the screen shot, the user can select various options—Test Run Queue, Start Test Results, Results Summary, Compile Build, and My Test Runs. FIG. 9 is a screen shot of the Results Summary in a summary view. FIG. 10 is a screen shot of a build compilation configuration. Here, the user can select a build server, branch, build label, etc. and perform a build compilation.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. An automation and regression management method for testing software in a highly-complex cloud-based system with a plurality of nodes, through an automation and regression management system, the method comprising:
   receiving a plurality of requests for automated test runs on nodes in the highly-complex cloud-based system;
   managing the plurality of requests by either starting an automated test run on a node or queuing the automated test run if another automated test run is already operating on the node;
   determining details of each of the automated test runs subsequent to completion;
   storing the details of each of the automated test runs in a database;
   providing the details of each of the automated test runs to a requesting user;
   receiving a new software build;
   performing compilation of the new software build; and
   installing the new software build on a node of the plurality of nodes.

2. The method of claim 1, wherein the automated test runs are scripts configured to test new software builds in the plurality of nodes.

3. The method of claim 1, wherein the automated test runs utilize any of Perl, Python, and Java.

4. The method of claim 1, further comprising:
   comparing the details of each of the automated test runs on a subset of nodes of the plurality of nodes, wherein the subset of nodes each include a same software build.

5. The method of claim 1, further comprising:
   receiving or creating the automated test runs for a new software build associated with the highly-complex cloud-based system.

6. The method of claim 1, wherein an automated test run is performed subsequent to the installing.

7. The method of claim 1, further comprising:
   notifying the requesting user responsive to the starting and the completion.

8. An automation and regression management system configured to test software in a highly-complex cloud-based system with a plurality of nodes, the system comprising:
   a network interface communicatively coupled to a user and one or more nodes in the highly-complex system;
   a processor communicatively coupled to the network interface; and
   memory storing computer executable instructions, and in response to execution by the processor, the computer executable instructions cause the processor to
      receive a plurality of requests for automated test runs on nodes in the highly-complex cloud-based system,
      manage the plurality of requests by either starting an automated test run on a node or queuing the automated test run if another automated test run is already operating on the node,
      determine details of each of the automated test runs subsequent to completion,
      store the details of each of the automated test runs in a database,
      provide the details of each of the automated test runs to a requesting user,
      receive a new software build,
      perform compilation of the new software build, and
      install the new software build on a node of the plurality of nodes.

9. The system of claim 8, wherein the automated test runs are scripts configured to test new software builds in the plurality of nodes.

10. The system of claim 8, wherein the automated test runs utilize any of Perl, Python, and Java.

11. The system of claim 8, wherein the memory storing computer executable instructions, and in response to execution by the processor, the computer executable instructions further cause the processor to:
    compare the details of each of the automated test runs on a subset of nodes of the plurality of nodes, wherein the subset of nodes each include a same software build.

12. The system of claim 8, wherein the memory storing computer executable instructions, and in response to execution by the processor, the computer executable instructions further cause the processor to:
    receive or create the automated test runs for a new software build associated with the highly-complex cloud-based system.

13. The system of claim 8, wherein an automated test run is performed subsequent to install of the new software build.

14. The system of claim 8, wherein the memory storing computer executable instructions, and in response to execution by the processor, the computer executable instructions further cause the processor to:
notify the requesting user responsive to the starting and the completion.

15. A cloud based security system, comprising:
a plurality of cloud nodes each communicatively coupled to the Internet and a plurality of users, wherein each of the plurality of cloud nodes is configured to perform a set of security functions for the plurality of users based on a software build executing thereon; and
an automation and regression management system communicatively coupled to the plurality of nodes and configured to test the software build on each of the plurality of nodes, the automation and regression management system comprising
a network interface communicatively coupled to a user and one or more nodes in the highly-complex system;
a processor communicatively coupled to the network interface; and
memory storing computer executable instructions, and in response to execution by the processor, the computer executable instructions cause the processor to
receive a plurality of requests for automated test runs on nodes of the plurality of cloud nodes,
manage the plurality of requests by either starting an automated test run on a node or queuing the automated test run if another automated test run is already operating on the node,
determine details of each of the automated test runs subsequent to completion,
store the details of each of the automated test runs in a database,
provide the details of each of the automated test runs to a requesting user,
receive a new software build,
perform compilation of the new software build, and
install the new software build on a node of the plurality of nodes.

16. The system of claim 15, wherein the automated test runs are scripts configured to test new software builds in the plurality of nodes.

17. The system of claim 15, wherein an automated test run is performed subsequent to install of the new software build.

18. The system of claim 15, wherein the automated test runs utilize any of Perl, Python, and Java.

19. The system of claim 15, wherein the memory storing computer executable instructions, and in response to execution by the processor, the computer executable instructions further cause the processor to:
compare the details of each of the automated test runs on a subset of nodes of the plurality of nodes, wherein the subset of nodes each include a same software build.

20. The system of claim 15, wherein the memory storing computer executable instructions, and in response to execution by the processor, the computer executable instructions further cause the processor to:
receive or create the automated test runs for a new software build associated with the highly-complex cloud-based system.

* * * * *